(No Model.)
G. H. STOCKMANN.
Thermostat for Incubators.
No. 233,444. Patented Oct. 19, 1880.
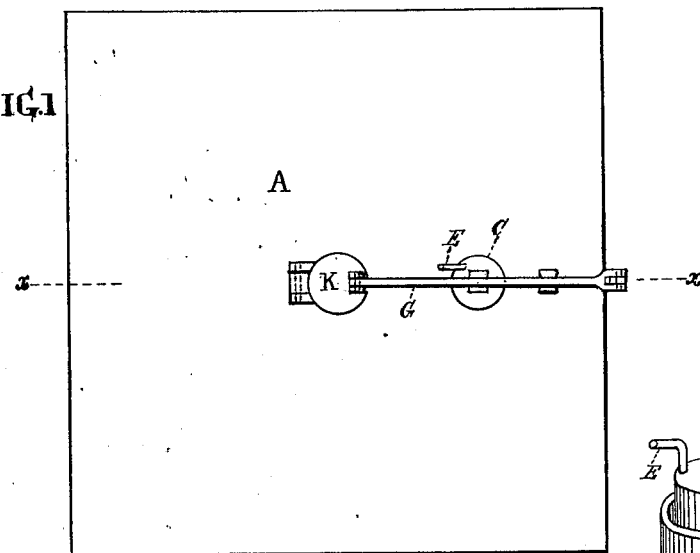
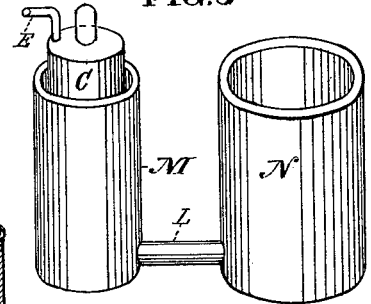
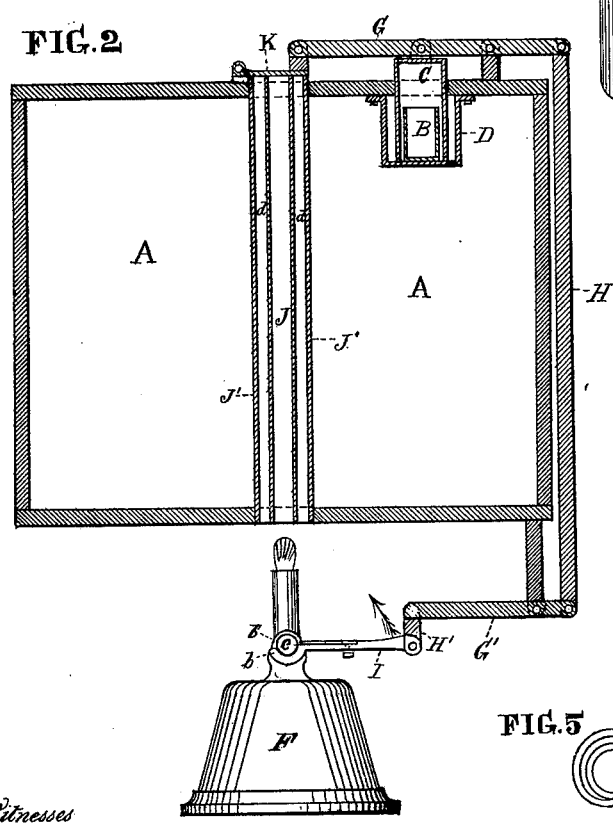
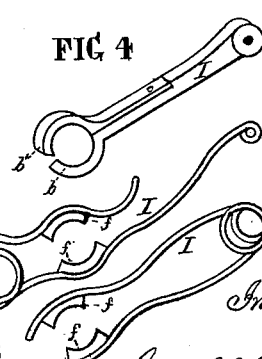
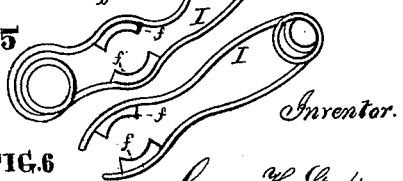

UNITED STATES PATENT OFFICE.

GEORGE H. STOCKMANN, OF PHILADELPHIA, PENNSYLVANIA.

THERMOSTAT FOR INCUBATORS.

SPECIFICATION forming part of Letters Patent No. 233,444, dated October 19, 1880.

Application filed April 21, 1880. (No model.)

*To all whom it may concern:*

Be it known that I, GEORGE H. STOCKMANN, a citizen of the United States, residing at Philadelphia, in the county of Philadelphia and State of Pennsylvania, have invented a new and useful Improvement in Thermometrical Thermostats for Incubators, of which the following is a specification.

My invention consists in the combination of the following devices with an incubator-case for warming and regulating the temperature, namely: a lamp which is placed beneath the case, and a thermostatic float connected with a fluid-cup within the case, and a system of levers and connecting-rods and a clasp, which form a connection between the float and the stem of the ratchet-wheel of the lamp, as hereinafter fully described.

The invention further consists in the combination of a vertical pipe provided with a valve with the case for carrying off the excess of heat from the lamp, there being a tube surrounding said pipe, whereby an annular space is provided for the passage of air, to prevent the radiation of heat from the pipe, when opened, to the incubator.

In the accompanying drawings, which make a part of this specification, Figure 1 is a plan view of an incubator provided with my improved thermostat. Fig. 2 is a side elevation, mostly in section, at the broken line $x\,x$ of Fig. 1. Fig. 3 is a perspective view of vessels M and N on an enlarged scale, the vessel M being provided with the float C and the two vessels connected together by means of the pipe L. Fig. 4 is a perspective view, on an enlarged scale, of the spring-clasp I. Figs. 5 and 6 are like views of modifications of the spring-clasp I.

Like letters of reference in all the figures indicate the same parts.

A represents the case of an incubator having my improved thermostat, in which B is a cup or vessel containing ether or other volatile fluid. C is a float consisting of a vessel of larger diameter than the vessel B, and is inverted over it; and D is a vessel of larger diameter than the float, and contains it and the vessel B. The annular spaces $a$ and $a'$ are to be partly filled with a suitable liquid to hermetically seal the float C, and to admit of the automatical rising and lowering of the float by the variation in the pressure of the ether or other volatile fluid inside of the float as the heat increases or diminishes.

I employ a pipe, E, or other suitable means for extracting air from the float C. The cup or vessel B may be dispensed with, in which case the volatile fluid will float inside of the float C on top of the sealing-fluid. Instead of the hollow float C, a cork or other equivalent float may be used.

F is a lamp for heating the incubator, a connection being formed with the float C by means of the levers G and G', connecting vertical rod H, short vertical rod H', and spring-clasp I, as clearly seen in Fig. 2. The spring-clasp is shown on an enlarged scale in Fig. 4. The jaw $b$ of the clasp may be rigid, the jaw $b'$ made thin to give it sufficient elasticity. The jaws are of curved form, as represented, so as to securely clasp the knob $c$ of the ratchet, which is automatically turned for the adjustment of the wick.

J is a vertical tube, the ends of which are connected to the bottom and top of the case A, for the escape of heat when it becomes too great. It is provided with a valve or damper, K, which is automatically opened when the heat becomes too great. J' is a tube, which surrounds the tube J, and is of larger diameter than the latter, to form a non-conducting annular space, $d$. The ends of the pipe J and tube J' are held in connection by any suitable means. The diameter of the valve K is equal to that of the tube J', so as to close the annular space $d$ when the valve is closed, and thus prevent a current of air through it, except when the excess of heat from the lamp is caused to escape through the pipe J. The pipe J furnishes a ready escape for the heat without its passing into or acting on the incubator.

The operation is as follows: When the heat in the incubator becomes too great it expands the volatile fluid under the float C and raises it, thereby operating the spring-clasp I by depressing the vertical rod H and elevating the vertical rod H', so as to turn the pivoted end of the spring-clasp in the direction of the arrow, and thereby turn the wick-ratchet to the left to partially turn the wick down, and thereby lower the temperature of the heat generated by the lamp. At the same time, by the upward movement of the float, the end of the lever G connected with the valve K is sufficiently elevated to raise the valve and admit of the escape of heat from the lamp through the tube J. As the temperature of the incubator is lowered by the above operation to its proper point the float C descends to its former position, whereby a reverse movement is given to the operating mechanism, the valve K is again closed, and a reverse movement given to the clasp I for the readjustment of the wick.

A modification of the construction and arrangement of the vessels and float is shown in Fig. 3, the vessels M and N being placed side by side and connected by means of the pipe L. If desired, the pipe L may be dispensed with by arranging the vessel M within the vessel N.

In the construction represented in Fig. 2, and also in the above-described modification, the pipe E is used for extracting air from the float C, or any other suitable means may be used.

The spring-clasp I may be made of wire, as shown in Figs. 5 and 6, or in other convenient manner, in which case curved blocks $f$, of metal, of suitable width to form bearings for the knob of the ratchet, should be soldered to the wire.

I claim as my invention—

1. In an incubator, the combination of the cup B, float C, levers G and G', vertical rods H and H', and clasp I, or its equivalent, with the case A and lamp F, substantially in the manner and for the purpose set forth.

2. The pipe J, provided with the valve K, in combination with the case A, lamp F, cup B, float C, and lever G, for automatically discharging the excess of heat from the lamp, substantially as described.

3. The combination of the tube J' with the case A and pipe J, having a valve, K, on its upper end, which covers the upper end of the tube J' as well as that of the pipe J, the pipe and tube being constructed and arranged in relation to each other as described, to have an annular space, $d$, between them for the passage of air when the valve K is open, substantially in the manner and for the purpose set forth.

4. A detachable spring-clasp, in combination with a lamp-ratchet and any suitable operating mechanism connected with a thermometrical float for the adjustment of the wick, substantially as set forth.

GEO. H. STOCKMANN.

Witnesses:
WM. LARZELERE,
STEPHEN USTICK.